No. 868,304. PATENTED OCT. 15, 1907.
C. H. TINGLEY.
HYDRAULIC CLUTCH AND TRANSMISSION DEVICE.
APPLICATION FILED NOV. 30, 1906.
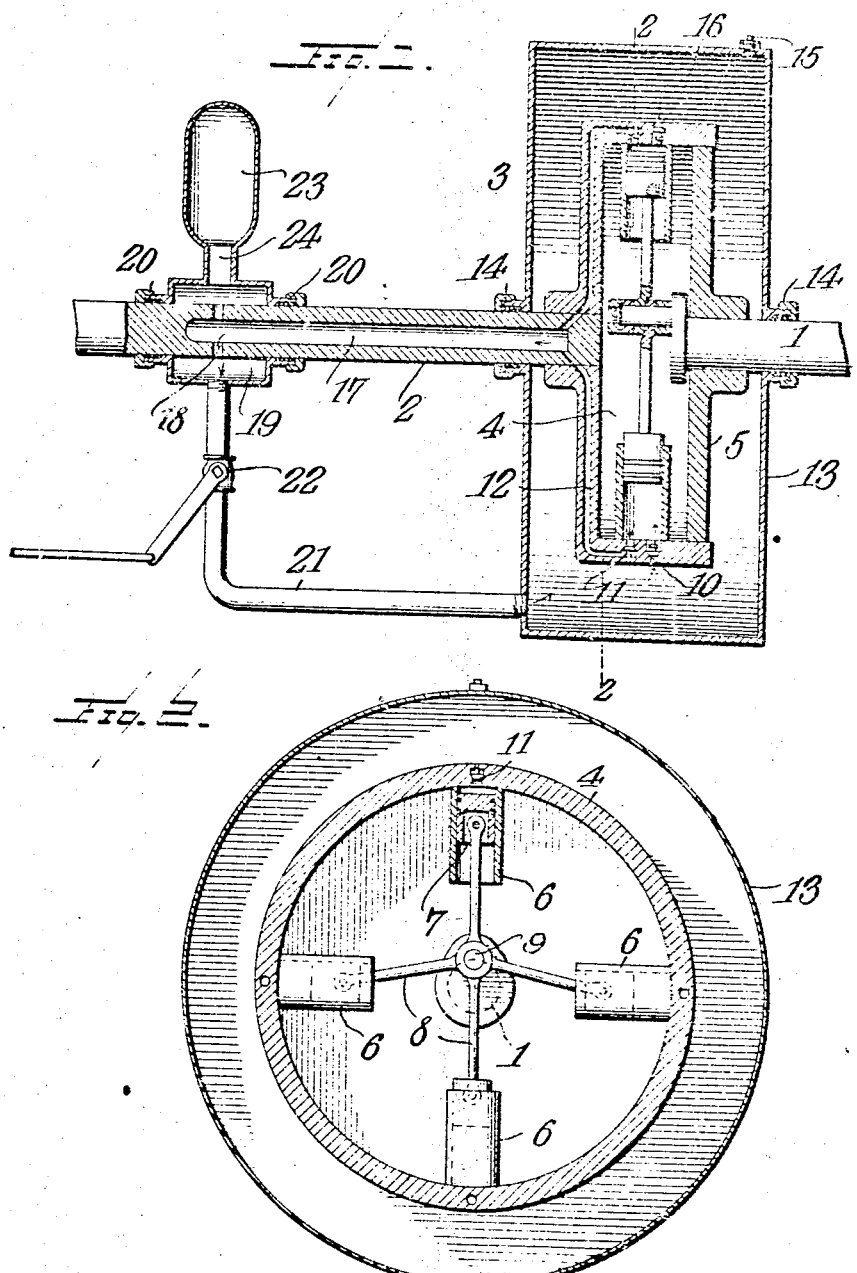
Clarence H. Tingley, INVENTOR.

UNITED STATES PATENT OFFICE.

CLARENCE H. TINGLEY, OF UNIONVILLE, MISSOURI.

HYDRAULIC CLUTCH AND TRANSMISSION DEVICE.

No. 868,304.  Specification of Letters Patent.  Patented Oct. 15, 1907.

Application filed November 30, 1906. Serial No. 345,745.

To all whom it may concern:

Be it known that I, CLARENCE H. TINGLEY, a citizen of the United States, residing at Unionville, in the county of Putnam and State of Missouri, have invented a new and useful Hydraulic Clutch and Transmission Device, of which the following is a specification.

This invention relates to a power transmitting device of the hydraulic type whereby power is transmitted from the driving to the driven element thereof through a suitable hydraulic medium which is adapted to be controlled so that the speed of rotation of the driven element can be gradually varied between maximum and minimum independently of the speed of the driving element. A mechanism of this character will be adaptable to a large variety of apparatus and is particularly useful in power systems for self propelled vehicles where a smooth gradation of speed for starting and stopping the vehicles is highly desirable.

The invention has for one of its objects to improve and simplify the construction and operation of power transmitting devices of this character so as to be reliable and efficient in use, easily controllable, and inexpensive to manufacture and keep in repair.

A further object of the invention is to provide an air cushioning device whereby certain shocks will not be transmitted through the hydraulic medium to the driven element, thereby insuring a smooth transmission of power and promoting the easy running of the vehicle.

With these objects in view, and others, as will appear as the nature of the invention is better understood, the invention comprises the various novel features of construction and arrangement of parts, which will be more fully described hereinafter and set forth with particularity in the claims appended hereto.

In the accompanying drawing, which illustrates one of the embodiments of the invention, Figure 1 is a central longitudinal section of the hydraulic clutch and transmission device. Fig. 2 is a vertical transverse section taken on line 2—2 of Fig. 1.

Corresponding parts in the several figures are indicated throughout by similar characters of reference.

Referring to the drawing, 1 designates the driving and 2 the driven shafts, and 3 designates generally the hydraulic drive between them. This hydraulic drive or clutch comprises a drum 4 rigidly secured to the driven shaft 2 and rotatably mounted on one end of the driving shaft 1. The head 5 of the drum is preferably removable for the purpose of permitting access to the interior. Suitably spaced apart in the drum are a plurality of radially disposed piston cylinders 6, in each of which reciprocates a piston 7 of the trunk type. These pistons are connected by means of independent rods 8 to a common crank pin 9 arranged on the inner end of the driving shaft 1. By this means, each piston moves back and forth once during each revolution of the driving shaft. These pumps operate on a confined body of liquid, such, for instance, as a suitable lubricating oil. Each cylinder is provided with an automatically actuated inlet valve 10 and with an automatically actuated discharge valve 11. The valves 11 control the discharge passages 12 formed in the drum 4 and extending from the cylinders radially toward the center of the drum to discharge into a common conduit whereby the lubricant, or other hydraulic medium, is conveyed back to the cylinders. By controlling the flow of lubricant from the pumps, it is obvious that the transmission of power by the pistons through the hydraulic medium to the driven shaft on which the piston cylinders are mounted can be varied, as desired.

Surrounding the drum 4 is a fluid tight casing 13 which forms a reservoir for the hydraulic medium, and through opposite walls of this casing, the shafts 1 and 2 extend, packings 14 being provided around the said shafts to prevent leakage. At the top of the casing is a plug closed filling aperture 15. The cylinders 6 communicate with the reservoir 13 through the inlet ports 16 that are controlled by the valves 10. The common conduit into which the passages 12 discharge is formed by boring out the driven shaft 2, and the outer end of this bore 17 is provided with short transverse passages 18 that open into a receiving chamber 19 stationarily supported on the driven shaft 2. This receiving chamber is provided with packings 20 to prevent leakage of the high pressure lubricant. Extending from the receiving chamber to the reservoir is a pipe 21 forming a by-pass which is controlled in any suitable manner, as by a valve 22, which is to be operated from the driver's seat. By means of this controlling valve, the discharge of liquid from the pumps can be retarded to any extent, so that the relative slip between the two elements or pistons and cylinders of the hydraulic clutch can be regulated from maximum to minimum, or vice versa. Obviously, when the valve 22 is fully open, the pistons 7 are free to reciprocate without transmitting motion through the hydraulic medium, and by closing the valve the flow of hydraulic medium is retarded to a greater or less extent, so that motion will be transmitted to the driven shaft, and when the valve 22 is completely closed, the driven shaft will be rotated at the same speed as the driving shaft, and the pistons are then idle and the elements of the device entirely clutched.

In order to cushion the discharge from the pumps and thereby eliminate shocks, a body of air under pressure is arranged at a suitable point between the pumps and the controlling valve 22, and, by preference, this body of air is contained in a dome 23 communicating with the receiving chamber 19 through the passage 24.

From the foregoing description, taken in connection with the accompanying drawing, the advantages of the construction and of the method of operation will be readily understood, and, while I have described the principle of operation of the invention, together with the apparatus which I now consider to be the best embodiment thereof, I desire to have it understood that the apparatus shown is merely illustrative, and that various changes may be made, when desired, as are within the scope of the invention.

What is claimed is:—

1. The combination in a clutch, of a stationary fluid reservoir, two relatively rotatable members having contiguous ends inclosed in said reservoir, pump pistons carried by one member in eccentric relation thereto, pump cylinders carried by the other member and equi-distantly located with relation to its axis, fluid inlet ducts from the reservoir to the pump cylinders, outlet ducts from the pump cylinders to the reservoir, and means for constricting the outlet ducts to regulate the degree of clutching action.

2. The combination in a clutch, of a stationary fluid reservoir, two relatively rotatable members having contiguous ends inclosed in said reservoir, pump pistons carried by one member in eccentric relation thereto, pump cylinders carried by the other member and equi-distantly located with relation to its axis, fluid inlet ducts from the reservoir to the pump cylinders, outlet ducts from the pump cylinders to the reservoir, means for constricting the outlet ducts to regulate the degree of clutching action, and an air cushion common to all the pumps.

3. In a device of the class described, the combination of a driving and a driven shaft, a stationary reservoir into which the adjacent ends of the shafts extend, a drum in the reservoir rigidly secured to one of the shafts, cylinders on the drum, pistons in the cylinders connected to the shaft other than the one having the drum, valve controlled inlets between the cylinders and reservoir, and a valve controlled by-pass between the cylinders and reservoir for controlling the discharge of liquid from the cylinders.

4. In a device of the class described, the combination of a driving and a driven shaft, a reservoir into which the adjacent ends of the shafts extend, packings around the shafts, a plurality of cylinders supported on and rotating with one of the shafts, pistons in the cylinders connected with the other shaft, valve controlled inlets between the cylinders and reservoir, a discharge conduit formed in the shaft carrying the cylinders, a receiving chamber on the said shaft into which the discharge conduit enters, packings around the shaft at the receiving chamber, and a valve controlled by-pass between the receiving chamber and reservoir.

5. In a device of the class described, the combination of a driving and a driven shaft, a reservoir into which the adjacent ends of the shafts extend, packings around the shafts, a hydraulic clutch between the shafts and inclosed in the reservoir and including a pump, a conduit in one of the shafts through which the pump discharges, a stationary receiving chamber mounted on the shaft having the conduit for receiving the discharge of the pump therefrom, packings around the shaft at the receiving chamber, an air containing dome communicating with the receiving chamber, and a valve controlled by-pass between the receiving chamber and reservoir.

In testimony that I claim the foregoing as my own, I have hereto affixed my signature in the presence of two witnesses.

CLARENCE H. TINGLEY.

Witnesses:
O. R. C. McCALMENT,
L. A. CARROLL.